Patented Mar. 18, 1930

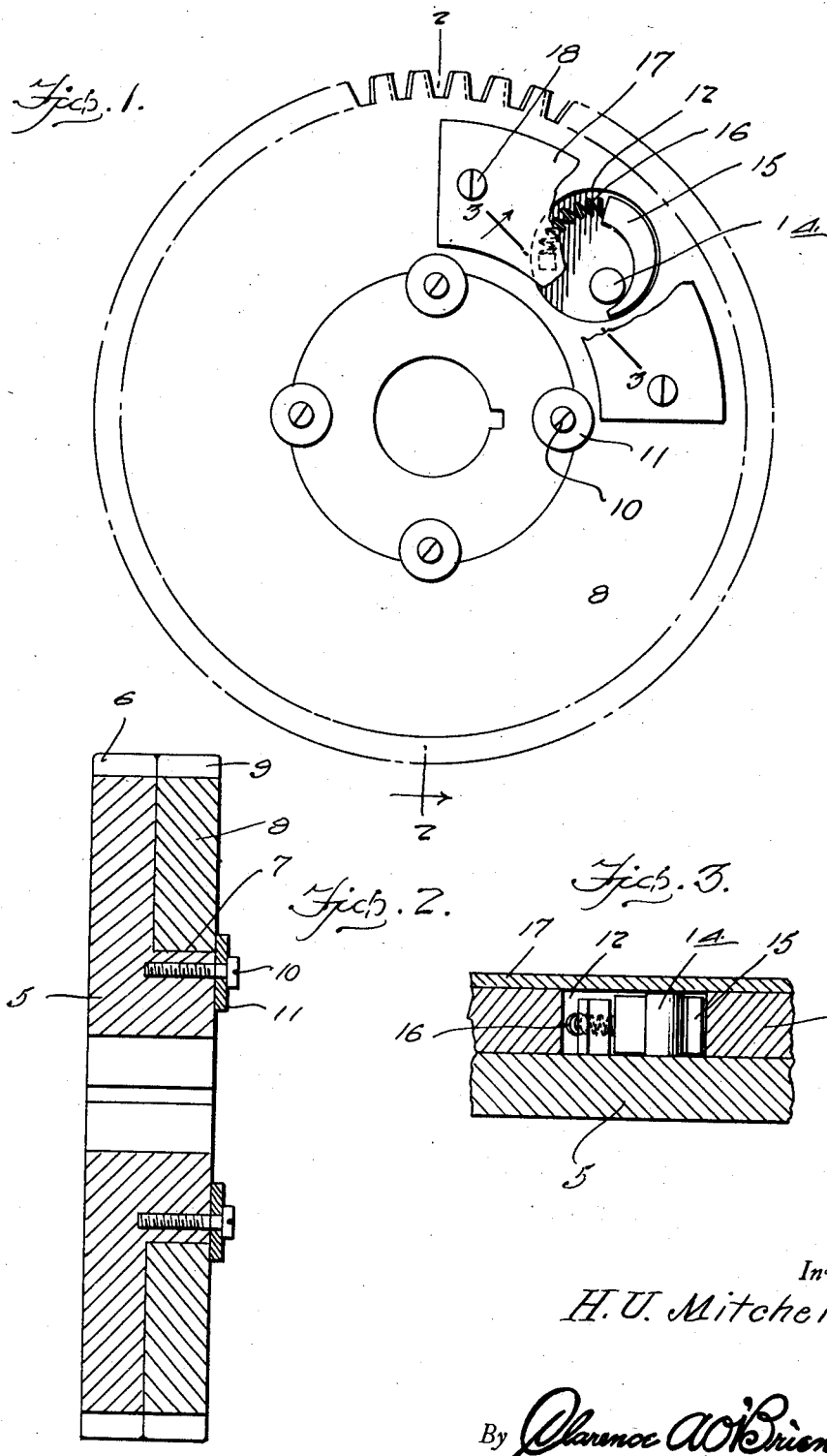

1,750,679

UNITED STATES PATENT OFFICE

HAROLD U. MITCHELL, OF MEDFORD, OREGON

GEAR

Application filed May 5, 1928. Serial No. 275,442.

The present invention relates to improvements in gears and has for its prime object to provide a gear with means for automatically compensating for back lash and the like due to wear.

A still further very important object of the invention resides in an improved gear of this nature which is exceedingly simple in its construction, inexpensive to manufacture, strong and durable, and thoroughly efficient and reliable in use.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of a gear embodying the features of my invention,

Figure 2 is a section therethrough taken substantially on the line 2—2 of Figure 1, and Figure 3 is a detail section therethrough taken substatnially on the line 3—3 of Figure 1.

Referring to the drawing in detail it will be seen that the numeral 5 denotes the gear with peripheral teeth 6 and the center of this gear is thickened to provide an annular shoulder 7 about which is adjustable a ring 8 with peripheral teeth 9. Bolts 10 or equivalent fastening elements are disposed through the thicker portion of the gear 5 and have washers 11 thereon to engage over the ring 8 and hold the same in place but allow the ring to revolve so as to change the location of the teeth 9 in respect to the teeth 6 for compensating for any wear in the teeth 6 thereby eliminating back lash and the like.

I have devised means for automatically adjusting the ring in respect to the gear and in the present embodiment this means includes the provision of an opening 12 through the ring 8, a pin 14 projecting laterally from the gear 5 into the opening 12 and a wedge 15 movable along one wall of the opening and engaging against the pin 14 and being pressed inwardly by a spring 16. A cover plate 17 is anchored as at 18 to the ring 8 and extends over the opening 12. It will thus be seen that if wear takes place in the teeth 6 and 9 the same will be compensated by the circumferential movement of the ring 8 thereby shifting the teeth 9 in respect to the teeth 6 and positively eliminating back lash.

The ring is locked after having been moved because of the relationship between the pin and the wedge. It is thought that the construction, operation and advantages of the invention will now be quite apparent to those skilled in this art without a more detailed description thereof.

The present embodiment of the invention has been disclosed in detail merely by way of example since in actual practice it obtains the features of advantage enumerated as desirable in the statement of the invention and the above description. It is apparent, however, that changes in the details of construction, and in the combination and arrangement of parts may be resorted to without departing from the spirit or scope of the invention, as hereinafter claimed or sacrificing any of its advantages.

Having thus described my invention, what I claim as new is:

In combination, a gear having peripheral teeth and provided with an annular concentric shoulder, a ring movable about the shoulder and having peripheral teeth associated with the first mentioned teeth, said ring being provided with an opening, a pin on the gear extending in the opening, a wedge between the pin and one wall of the opening, and a spring impinging against the wedge.

In testimony whereof I affix my signature.

HAROLD U. MITCHELL.